United States Patent

Greiner et al.

[11] Patent Number: 5,890,958
[45] Date of Patent: Apr. 6, 1999

[54] VENTILATION NOZZLE

[75] Inventors: Ferdinand Greiner, Wildberg; Josef Wamhoff, Nufringen, both of Germany

[73] Assignee: Daimler-Benz Aktiengesellschaft, Stuttgart, Germany

[21] Appl. No.: 977,617

[22] Filed: Nov. 25, 1997

[30] Foreign Application Priority Data

Nov. 25, 1996 [DE] Germany ............ 196 48 736.6

[51] Int. Cl.⁶ ............................................. B60H 1/34
[52] U.S. Cl. ................................................ 454/155
[58] Field of Search ........................ 454/152, 155, 454/313

[56] References Cited

FOREIGN PATENT DOCUMENTS 2 585 637   2/1987   France .

Primary Examiner—Harold Joyce
Assistant Examiner—Derek S. Boles
Attorney, Agent, or Firm—Evenson, McKeown, Edwards & Lenahan P.L.L.C.

[57] ABSTRACT

A ventilation nozzle for vehicle interiors, having a front screen which is visible in the vehicle interior and having a multiplicity of screen openings. An air-guide block, made of elastic material, is arranged upstream, in the air-flow direction, of the front screen, having a multiplicity of parallel air ducts passing longitudinally through it. An adjusting device changes the flow direction of the air flowing out of the front screen. For the purpose of producing diffused ventilation, the air-guide block is placed nonpositively against the front screen and the adjusting device is additionally designed in such a manner that it is able to raise the air-guide block, counter to a biasing force, from the front screen.

12 Claims, 3 Drawing Sheets

VENTILATION NOZZLE

BACKGROUND AND SUMMARY OF THE INVENTION

This application claims the priority of German application 196 48 736.6, the disclosure of which is expressly incorporated by reference herein.

The invention relates to a ventilation nozzle for vehicle interiors.

In a ventilation nozzle known from French patent document Fr 2 585 637 A1, the air-guide block together with its air-duct register is manufactured from close-pored, foamed elastomer or polymer and fastened to the rear side of the front screen. The adjusting device for adjusting the air-guide block, and hence for changing the air-outflow direction from the ventilation nozzle, has two toothed racks which are aligned at right angles with respect to each other and are fastened to the rear side of the air-guide block. Meshing with the toothed racks are pinion wheels which can be rotated via adjusting wheels, which can be operated manually. A respective adjusting wheel is provided for adjusting the air-exit direction in the vertical plane and in the horizontal plane. If one of the adjusting wheels is rotated, that pinion wheel which is rotated thereby and meshes with the particular toothed rack displaces the vertical or horizontal toothed rack and, in doing so, adjusts the air-guide block in such a manner that the air ducts are positioned, in the vertical plane or horizontal plane, at an angle of inclination with respect to the front screen and, as a result, the air-outflow direction changes. However, in all cases the air flow is linear and hence suitable for flowing directly against windows etc. When flowing towards the vehicle occupants, in contrast, a diffused distribution of air is preferred for reasons of air-conditioning comfort.

An object of the invention is to improve a ventilation nozzle such that in addition to setting the direct outflow direction with a linear air flow, it is also possible to convert the linear air flow into a diffused swirl of air.

According to the invention, this and other objects have been achieved by providing a ventilation nozzle to be mounted to an air-conduction duct of a ventilation or air-conditioning system of a vehicle, comprising: a front screen to be exposed to an interior of the vehicle, said front screen having screen webs which define a plurality of screen openings; an air-guide block made of an elastic material arranged upstream of the front screen, a front side of the air-guide block being biased by a biasing force nonpositively against the screen webs of the front screen, said air-guide block defining a plurality of parallel air ducts passing longitudinally therethrough, said air ducts having a cross-section corresponding to a cross-section of the screen openings; and an adjusting device coupled to the front screen and to the air guide block, said adjusting device being adjustable to displace a rear side of the air guide block which faces away from the front screen approximately parallel to the front screen in at least two orthogonal directions in order to change a flow direction through said air ducts, the adjusting device being adjustable to move the air-guide block counter to the biasing force away from the front screen such that a clearance is defined between the front side of the air-guide block and the front screen.

According to the invention, this and other objects have been achieved by providing a ventilation nozzle for an air-conduction duct of a vehicle, comprising: a front screen having webs which define a plurality of screen openings; an elastic air-guide block arranged adjacent and upstream of the front screen, said air-guide block defining a plurality of parallel air ducts which are aligned with said screen openings at a downstream side of the air-guide block; a control plate fixedly coupled to an upstream side of the air-guide block, said control plate defining a plurality of openings which are aligned with said air ducts at the upstream side of said air-guide block; a control rod defining a longitudinal axis being articulated on said front screen via a first spherical body seated in a cup defined in said front screen, said control member being articulated on said control plate via a second spherical body seated in a cup defined in said control plate, said control rod being displaceable along said axis relative to said first spherical body to displace said second spherical body, said control plate, and said air guide block along said axis relative to said front screen.

The ventilation nozzle according to the invention has the advantage that, as the result of the front side of the air-guide block being raised from the screen webs of the front screen, a space without air-guide elements is formed between the air-guide block and the front screen, in which space the linear air flows emerging from the individual air ducts of the air-guide block swirl together and hence a diffused volume of air exits from the ventilation nozzle. The swirling of the air leaving the ventilation nozzle is further assisted by the front screen through which the volume of air, which has already been swirled, has to flow.

The ventilation nozzle according to the invention can be manufactured at low cost and can be assembled in a simple manner, it being possible for individual nozzles to be combined in a large component without any problem. As regards its design, the front screen may be configured freely without this involving changes to the remaining components, apart from to the shape of the air-duct cross-section in the air-guide block. The front screen may thus be provided, for example, with hexagonal, rectangular, square, round or oval screen openings and may be realized using any desired materials. Behind the front screen, which can be configured freely in terms of design, the technical realization of the ventilation nozzle remains, however, unchanged, with the result that the ventilation nozzle is a standardized component having universal applicability.

According to a preferred embodiment of the invention a rigid control plate having a screen structure corresponding to the front screen is fastened to the rear side of the air-guide block. The adjusting device has a rod-shaped control member which is guided through the air-guide block, is mounted in the front screen, bears a hand-operated knob protruding in front of the front screen and is joined in an articulated manner to the control plate. These constructive measures make it possible for the adjusting device for all three adjusting functions, i.e. direct air flow with the air-flow setting in the horizontal direction, direct air flow with the air-flow setting in the vertical direction and diffused ventilation, to manage with just a single control member which has to be pivoted, or axially displaced, in order to bring about the three adjusting functions, it being possible for the axial displacement alternatively to be brought about by axial displacement or rotation of the hand-operated knob.

According to an advantageous embodiment of the invention, the front screen and control plate are preferably manufactured from aluminum, and the air-guide block, which is preferably of cellular rubber, is injection-moulded onto the control plate during the manufacturing process.

For the non-positive bearing of the air-guide block against the front screen, according to an advantageous embodiment of the invention, at least one spring acts upon the control plate, to be precise, acts upon the control plate preferably in the articulation region of the control member. The at least one spring may be designed as a compression spring supported in a fixed position in the air-conduction stub, or may be designed as a tension spring which is then enclosed in the through-hole in the air-guide block, which through-hole accommodates the control member, and is fitted to the front screen.

According to a preferred embodiment of the invention, the articulated joining of the control member to the control plate and mounting thereof in the front screen are implemented by a respective spherical cup being moulded in the control plate and the front screen, and the two spherical cups, which with their openings face one another, in each case rotatably accommodate one of two spherical bodies arranged on the control member. That spherical cup which is on the front-screen side has a central opening for the passage of the rod-shaped control member. That spherical body which is accommodated axially and undisplaceably in the spherical cup on the front-screen side is seated axially displaceably on the control member. A lock is effective between this spherical body and the control member, which lock retains a relative position, adjusted via the hand-operated knob, of the spherical body and control member. In that spherical cup which is on the front-screen side, it is possible, after the hand-operating knob has been grasped, for the control member to be pivoted radially in all directions for the purpose of adjusting the direct air flow, that spherical body which is accommodated in the spherical cup on the control-plate side converting this pivoting movement into a displacement movement of the control plate in its plane, and hence causing the air-guide block, which is connected fixedly to the control plate, to be deformed. In order to set the diffused ventilation, the control member has to be displaced in the axial direction, as a result of which, via the spherical cup on the control-plate side, the control plate and the air-guide block connected fixedly to said plate are displaced axially and the said air-guide block is raised from the front screen.

According to a preferred embodiment of the invention, the axial displacement of the control member is brought about in that a threaded hole is provided in that spherical body which is accommodated by that spherical cup which is on the front-screen side, into which threaded hole an external threaded section, provided on the control member, is screwed. Rotation of the hand-operated knob about the axis of the control member hence causes the air-guide block to be raised from the front screen so as to produce the diffused ventilation, it being possible for the axial spacing to be adjusted continuously.

Other objects, advantages and novel features of the present invention will become apparent from the following detailed description of the invention when considered in conjunction with the accompanying drawings.

DETAILED DESCRIPTION OF THE DRAWINGS

Figure 1:
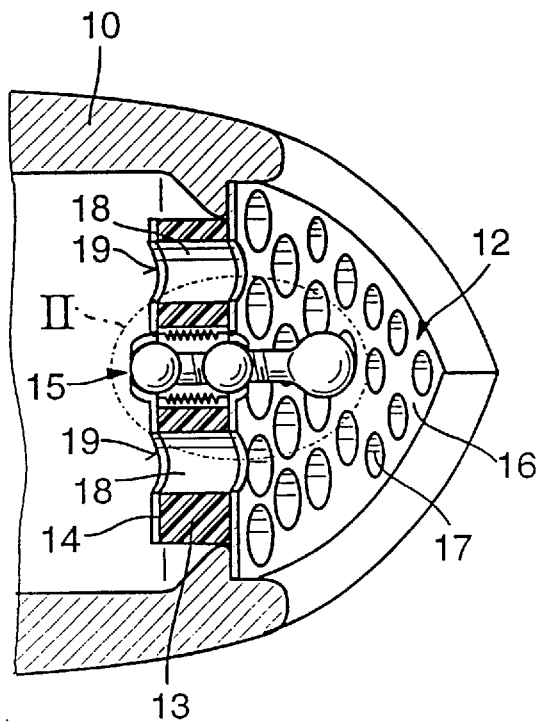
FIG. 1 shows a longitudinal section of a ventilation nozzle according to a preferred embodiment of the present invention.

The ventilation nozzle, represented perspectively in longitudinal section in FIG. 1, for vehicle interiors is connected to the front end of an air-conduction stub 10 of a ventilation or air-conditioning system, or is inserted directly into the front opening of the air-conduction stub 10. The ventilation nozzle consists of a front screen 12, which is visible from the vehicle interior and is fastened to the air-conduction stub 10, an air-guide block 13, made of elastic material, which is arranged upstream, in the air-flow direction, of the front screen and has an air-duct register and a control plate 14, which is fastened to the rear side, facing away from the front screen 12, of the air-guide block 13, as well as of an adjusting device 15 which acts upon the control plate 14. The front screen 12, which is configured in accordance with design considerations, has a multiplicity of screen openings 17 separated from one another by screen webs 16.

In the exemplary embodiment of FIG. 1, the screen openings 17 are of circular or oval design. The air-duct register in the air-guide block 13 consists of a multiplicity of parallel air ducts 18 which pass longitudinally through it and of which two air ducts 18 can be seen in section in FIG. 1. The clear cross-section of the air ducts 18 corresponds to the cross-section of the screen openings 17, with the result that when the air ducts 18 are aligned flush with the screen openings 17, the linear air flows passing through the air-duct register emerge out of the ventilation nozzle undisturbed by the front screen 12.

In the exemplary embodiment in FIG. 1, the clear cross-section of the air ducts 18, corresponding to the circular or oval cross-section of the screen openings 17, is also of circular or oval design. The rigid control plate 14, which is manufactured, for example, from aluminum, is provided with a screen structure corresponding to the front screen 12, i.e. in the exemplary embodiment of FIG. 1 with circular or oval openings 19 which are aligned congruent to the air ducts 18 in the air-guide block 13. As elastic material for the air-guide block 13 use is preferably made of what is known as cellular rubber which is injection-moulded onto the control plate 14 during the manufacturing process, with the result that the control plate 14 is held inseparably on the rear side of the air-guide block 13.

Figure 2:
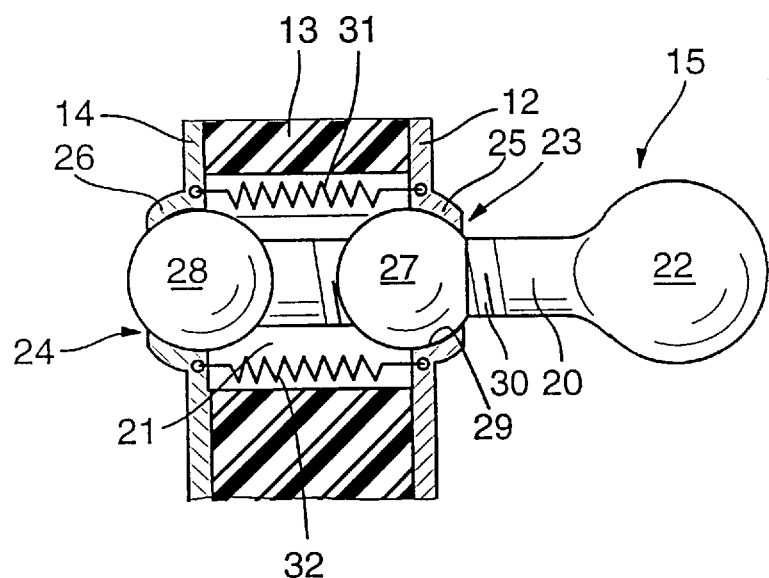
FIG. 2 shows an enlarged view of the portion II in FIG. 1.

The adjusting device 15 has a rod-shaped control member 20 which is guided through a central hole 21 in the air-guide block 13, is articulated by its one end on the control plate 14 and at its other end bears a hand-operated knob 22 protruding in front of the front screen 12 (FIG. 2). The control member 20 is mounted approximately centrally in the front screen 12 which, for its part, is fastened to the front side of the air-conduction stub 10. The mounting of the control member 20 in the front screen 12 and the articulated joining of the control member 20 to the control plate 14 is respectively implemented by a ball-and-socket joint 23 and 24. For this purpose, a spherical cup 25 is formed on the front screen 12 and a spherical cup 26 is formed on the control plate 14.

The two spherical cups 25, 26 are arranged coaxially with respect to the central hole 21, and the spherical cup 25 which is on the front-screen side has a central opening 29 for the passage of the control member 20. The spherical cup 26 which is on the control-plate side accommodates a spherical body 28, which is integrally formed on the end of the control member 20. The spherical cup 25 which is on the front-screen side accommodates a spherical body 27, which is axially displaceable on the control member 20, and surrounds said spherical body 27 in such a manner that it is enclosed axially undisplaceably in the spherical cup 25. The spherical body 27 has a threaded hole (not shown here) into which an external threaded section 30 of the round rod-shaped control member 20 is screwed.

The control plate 14 is loaded, in the direction of the front screen 12, by an axial force which acts in the direction of the control-member axis, with the result that, on the one hand, the air-guide block 13 is pressed nonpositively against the screen webs 16 of the front screen 12, and, on the other hand, the spherical cup 26 is biased against the spherical body 28, and the spherical body 27 is biased against the spherical cup 25. The axial force is implemented via two tension spring s 31, 32 which are arranged within the central hole 21 in the air-guide block 13 and act, on the one hand, upon the control plate 14 and, on the other hand, upon the front screen 12.

Figure 3:
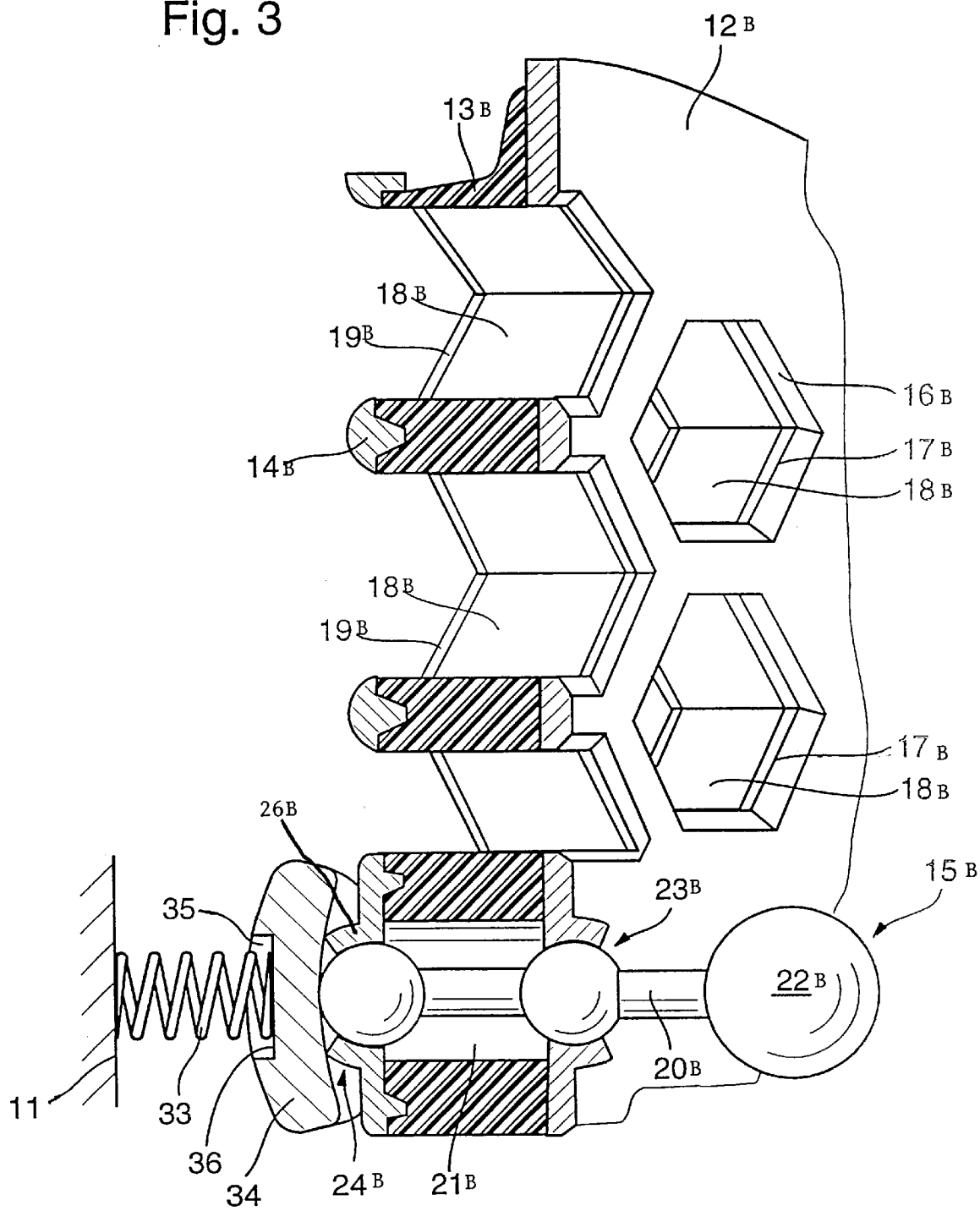
FIG. 3 shows a perspective view of the ventilation nozzle according to a further exemplary embodiment, in part and in longitudinal section, FIGS. 4 to 7 each show a diagrammatic sectional view of the ventilation nozzle in FIGS. 1 or 3, with four different setting variants for the air flowing out of the ventilation nozzle.

In the ventilation nozzle shown in part in longitudinal section and perspectively in FIG. 3, this axial force is implemented by a compression spring 33 which, on the one hand, is supported on a stop 11 in the air-conduction stub 10 and, on the other hand, bears against the spherical cup 26B which is on the control-plate side, via a curved pressure disk 34. In this case, the concave side of the pressure disk 34 faces the spherical cup 26, while a recess 35 having a planar supporting surface 36 for the compression spring 33 is formed in the convex side of the pressure disk 34. The ventilation nozzle according to FIG. 3 further differs from the ventilation nozzle according to FIGS. 1 and 2 in that the front screen 12B is designed in the manner of a honeycomb with hexagonal screen openings 17B. Correspondingly, the air ducts 18B of the air-duct register in the air-guide block 13B have an identical hexagonally shaped cross-section, and also the control plate 14B has the identical screen structure as the front screen 12B. Otherwise, the ventilation nozzle according to FIG. 3 corresponds to that of FIGS. 1 and 2, and corresponding components are hence provided with the same reference numbers appended with a "B".

Figure 4:
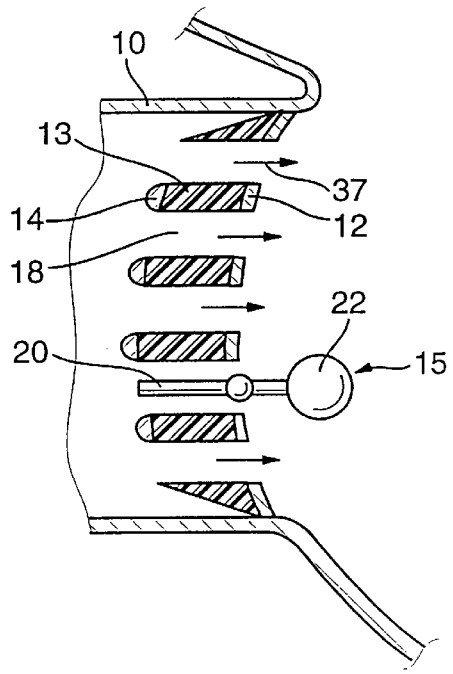
Figure 5:
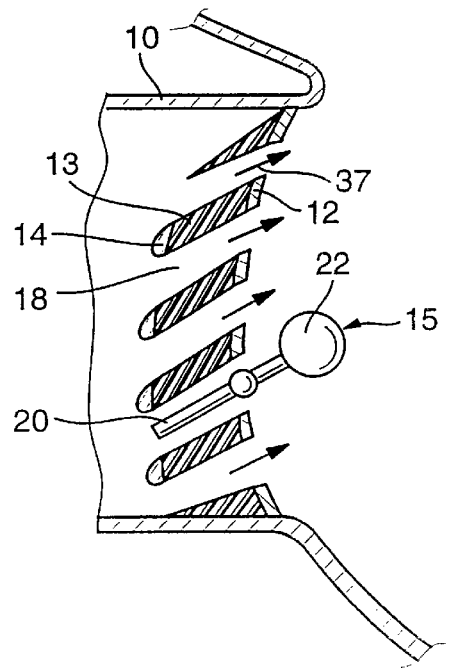

The different adjusting functions of the ventilation nozzle are illustrated in the sectional views of FIGS. 4–7. In FIG. 4 the control member 20 adopts a position in which the axis of the control member 20 coincides with the axis of the central hole 21 in the air-guide block 13. This position of the control member 20 is also represented in FIGS. 2 and 3. The air conducted through the air-conduction stub 10 passes through the ventilation nozzle, the air leaving the nozzle in linear air flows through the individual air ducts 18. The air-flow direction of the direct ventilation is parallel to the axis of the ventilation nozzle. The individual linear air flows are symbolized in FIG. 4 by arrows 37.

Figure 6:
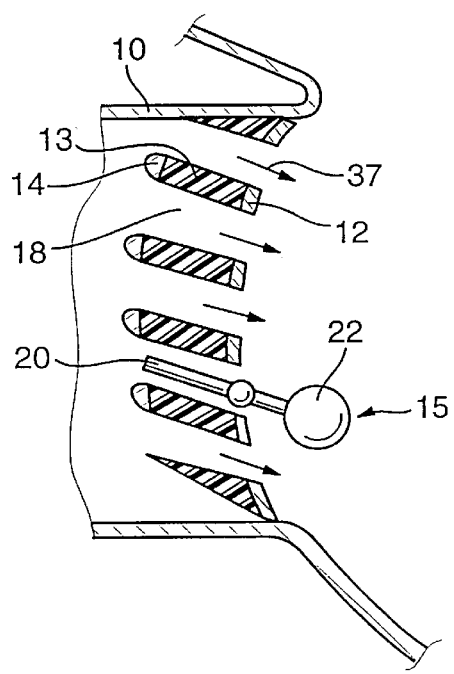

If the hand-operated knob 22 of the adjusting device 15 is grasped and pivoted vertically upwards (FIG. 5), the control plate 14 is displaced vertically downwards, said control plate deforming the air-guide block 13 in such a manner that the parallel air ducts 18 extend at an angle of includination with respect to the front screen 12. The linear air flows emerging from the ventilation nozzle (arrow 37) are directed vertically upwards. If the hand-operated knob 22, as shown in FIG. 6, is pivoted vertically downwards, the control plate 14 on the rear side of the air-guide block 13 is displaced vertically upwards and deforms the air-guide block 13 in the opposite direction. The air ducts 18 are directed downwards at an angle of declination with respect to the front screen 12 and the linear air flows (arrow 37) are likewise directed downwards.

If the hand-operated knob 22 is pivoted towards the left or right in the horizontal direction, the control plate 14 on the rear side of the air-guide block 13 is conversely displaced in the same manner to the right or left and deforms the air-guide block 13 in such a manner that the parallel air-guide ducts 18 are positioned to the left or right at an acute angle, and hence the flow direction of the direct ventilation is likewise adjusted to the left or right. Since the control member 20 is mounted in that ball-and-socket joint 23 which is on the front-screen side, it is not only possible for the hand-operated knob 22 to be deflected—as described—in the orthogonal directions, but also in all other radial directions. The air ducts 18 and the outflow direction of the linear air flows 37 are correspondingly adjusted. In all pivoting positions of the hand-operated knob 22 the control member 20 remains, due to the corresponding locking property (e.g. due to frictional forces between the spherical body 27 and the spherical cup 25 and due to the biasing forces of the tension springs 31, 32), in its manually set position, with the result that the ventilation nozzle remains in the selected air-outflow direction.

Figure 7:
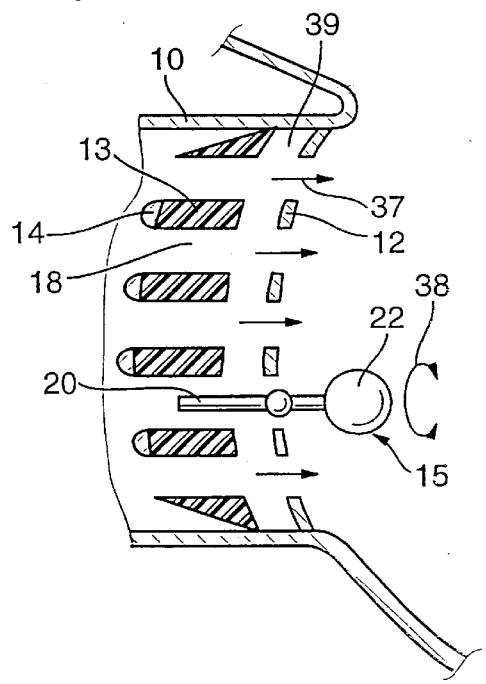

If the hand-operated knob 22 is rotated clockwise, in the arrow direction 38, (FIG. 7) about the axis of the control member 20, the external threaded section 30 is screwed further into the threaded hole of the spherical body 27 held in the spherical cup 25 on the front-screen side. The spherical body 28, displaced as a result, on the control member 20 displaces, via the spherical cup 26 which is on the control-plate side, the control plate 14 counter to the force of the tension springs 31, 32 (FIG. 2), or the force of the compression spring 33 (FIG. 3), and, as a result, the front side of the air-guide block 13 connected fixedly to the control plate 14, is moved apart from the front screen 12. As is illustrated in FIG. 7, a clearance 39 is produced between the air-guide block 13 and the front screen 12, in which clearance the linear air flows (arrows 37), emerging from the air ducts 18 of the air-guide block 13, swirl together.

Rotation of the hand-operated knob 22 to a greater or lesser extent makes it possible for the axial width of the clearance 39 to be changed continuously and hence for the swirling of the air to be influenced. A diffused air flow now emerges from the ventilation nozzle, this air flow being suitable for flowing towards the vehicle occupants. Rotation of the hand-operated knob 22 counterclockwise, in the arrow direction 38, makes it possible for the diffused ventilation setting of the ventilation nozzle to be reduced or eliminated again and for the direct air outflow to be re-established.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A ventilation nozzle to be mounted to an air-conduction duct of a ventilation or air-conditioning system of a vehicle, comprising:

a front screen to be exposed to an interior of the vehicle, said front screen having screen webs which define a plurality of screen openings;

an air-guide block made of an elastic material arranged upstream of the front screen, a front side of the air-guide block being biased by a biasing force nonpositively against the screen webs of the front screen, said air-guide block defining a plurality of parallel air ducts passing longitudinally therethrough, said air ducts having a cross-section corresponding to a cross-section of the screen openings; and an adjusting device coupled to the front screen and to the air guide block, said adjusting device being adjustable to displace a rear side of the air guide block which faces away from the front screen approximately parallel to the front screen in at least two orthogonal directions in order to change a flow direction through said air ducts, the adjusting device being adjustable to move the air-guide block counter to the biasing force away from the front screen such that a clearance is defined between the front side of the air-guide block and the front screen.

2. A ventilation nozzle according to claim 1, wherein a control plate having a screen structure corresponding to the front screen is fastened to the rear side of the air-guide block, the adjusting device having a rod-shaped control member which is articulated on the control plate, which is guided through the air-guide block, which is mounted in the front screen, and which has a manually-operated knob protruding in front of the front screen.

3. A ventilation nozzle according to claim 2, wherein the control plate is manufactured from aluminum and the air-guide block is injection-molded onto the control plate.

4. A ventilation nozzle according to claim 2, wherein said biasing force is produced by at least one spring acting upon the control plate proximate an area in which the rod-shaped control member is articulated on the control plate, said spring being one of connected in tension with the front screen and connected in compression with a stop upstream of the control plate.

5. A ventilation nozzle according to claim 2, wherein the rod-shaped control member is articulated on the control plate and is mounted in the front screen via respective ball-and-socket joints.

6. A ventilation nozzle according to claim 5, wherein said ball-and-socket joints comprise two spherical cups defined in the control plate and in the front screen, respectively, such that the spherical cups face each other, and two spherical bodies arranged on the control member, the spherical cup in the front screen having a central opening for receiving the control member.

7. A ventilation nozzle according to claim 6, wherein one of the spherical bodies is seated axially undisplaceably in the spherical cup in the front screen and is displaceably coupled to the control member such that a position of the control member relative to said one of the spherical bodies is adjustable via the manually-operated knob.

8. A ventilation nozzle according to claim 7, wherein the control member has a threaded section which engages a correspondingly threaded hole defined in said one of the spherical bodies.

9. A ventilation nozzle according to claim 7, wherein the control member bears latching lugs which are arranged with axial spacing and interact with a latching cavity formed in a throughhole defined in said one of the spherical bodies.

10. A ventilation nozzle according to claim 6, wherein said biasing force is produced by at least one spring connected in compression with a stop upstream of the control plate, said spring bearing against the spherical cup defined in the control plate via a curved pressure disk, said pressure disk having a concave side facing said spherical cup defined in the control plate, said pressure disk having a convex side in which a recess having a planar supporting surface is defined, said spring bearing against said planar supporting surface.

11. A ventilation nozzle for an air-conduction duct of a vehicle, comprising:

a front screen having webs which define a plurality of screen openings;

an elastic air-guide block arranged adjacent and upstream of the front screen, said air-guide block defining a plurality of parallel air ducts which are aligned with said screen openings at a downstream side of the air-guide block;

a control plate fixedly coupled to an upstream side of the air-guide block, said control plate defining a plurality of openings which are aligned with said air ducts at the upstream side of said air-guide block;

a control rod defining a longitudinal axis being articulated on said front screen via a first spherical body seated in a cup defined in said front screen, said control member being articulated on said control plate via a second spherical body seated in a cup defined in said control plate, said control rod being displaceable along said axis relative to said first spherical body to displace said second spherical body, said control plate, and said air guide block along said axis relative to said front screen.

12. A ventilation nozzle according to claim 11, wherein said control rode is displaceable such that said downstream side of the air-guide block is displaceable between a position abutting said front screen and a predetermined maximum clearance from said front screen.

* * * * *